Dec. 22, 1953  H. D. HERDER  2,663,331
HOLD-DOWN FOR JIG SAWS OR THE LIKE
Filed April 23, 1949  2 Sheets-Sheet 1
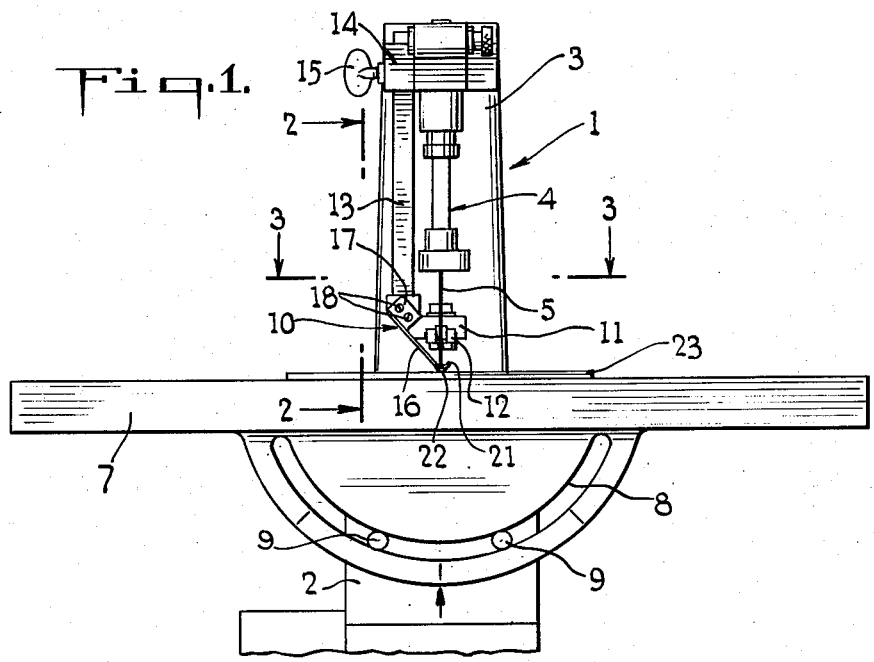
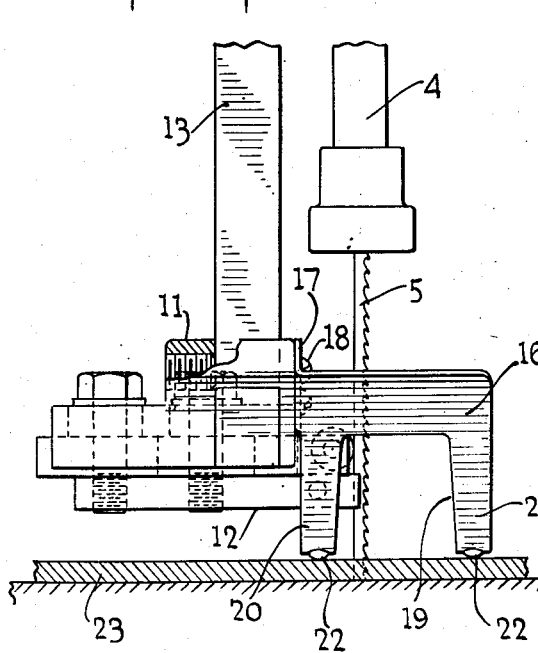
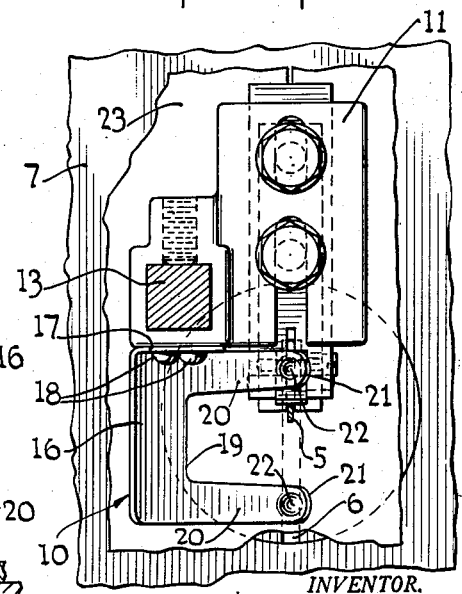
INVENTOR.
HARRY D. HERDER
BY
*Kenyon & Kenyon*
ATTORNEYS Dec. 22, 1953  H. D. HERDER  2,663,331
HOLD-DOWN FOR JIG SAWS OR THE LIKE
Filed April 23, 1949  2 Sheets-Sheet 2

INVENTOR.
HARRY D. HERDER
BY
ATTORNEYS

Patented Dec. 22, 1953

2,663,331

UNITED STATES PATENT OFFICE 2,663,331

HOLD-DOWN FOR JIG SAWS OR THE LIKE

Harry D. Herder, Kalamazoo, Mich., assignor to Atlas Press Company, Kalamazoo, Mich., a corporation of Michigan Application April 23, 1949, Serial No. 89,188

5 Claims. (Cl. 143—157)

This invention relates to improvements in hold-down devices for jig saws or the like.

It has for an object the provision of an effective hold-down device for jig saws or the like which also serves as a guard to the user.

Another object of the invention is to provide such a hold-down which can be used in combination with a tilting table and which need not be tiltably adjusted to accommodate the angle of tilt.

Another object is to provide such a hold-down which can be made easily and inexpensively.

Other objects and advantages will appear from a consideration of the mechanism which is illustrated in the accompanying drawings in which:

Fig. 1 is an elevational view of a jig saw embodying the invention;

Fig. 2 is a detailed, sectional view taken on the line 2, 2 of Fig. 1;

Fig. 3 is a detailed, sectional view taken on the line 3, 3 of Fig. 1;

Figure 4:
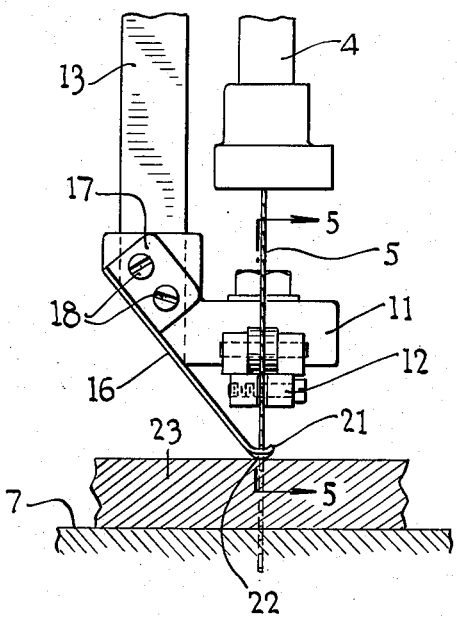
Fig. 4 is an enlarged, detailed, elevational view partly in section showing the hold-down device in detail.
Figure 5:
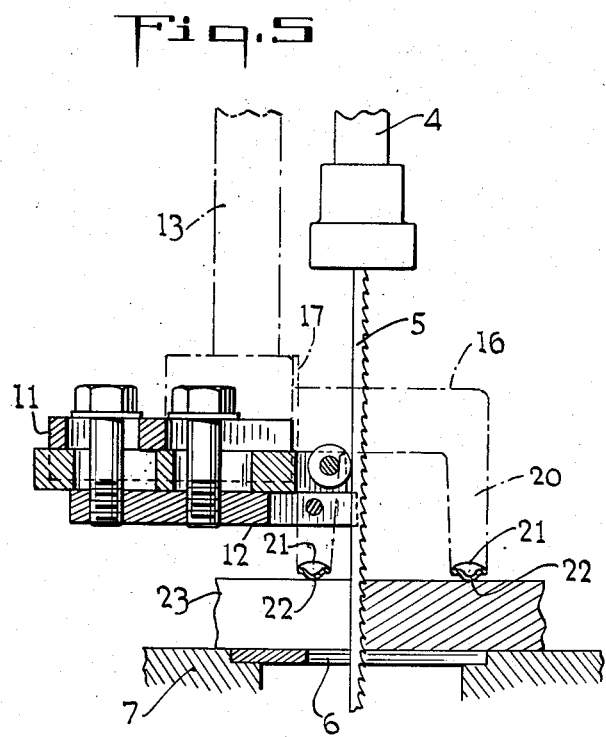
Fig. 5 is a detailed, sectional view on the line 5, 5 of Fig. 4.

The improved work-hold-down device is shown on a jig saw, indicated generally at 1, which has a base 2 and a supporting frame 3 for supporting the guiding mechanism 4 for the upper end of the saw 5, which operates vertically, as is standard in such devices, and extends through an opening 6 in a work-supporting table 7, which is provided with a suitable trunnion bearing 8 which rides on bearing members 9 to permit tilting of the table.

In the form of the invention shown, the table is tiltable through an angle of 60°, 45° one way; 15° the other from the horizontal. The trunnion bearing 8 is so disposed that the axis of tilting lies substantially in the plane of the top of the table and in the work plane of the saw or tool 5 which is the plane of the cutting run of the saw. The work-hold-down device, indicated generally at 10, is supported on a member 11 which serves also as a support for the saw or tool-guiding means 12 and is provided with a vertical rod or bearing 13, which is slidable in the head 14 to adjusted position, where it may be held by a thumb screw 15. The work-hold-down device 10 in the preferred form consists of a spring steel plate 16 having a suitable attaching bracket 17 provided with apertures to receive attaching screws 18, which are threaded into the supporting member 11.

The lower edge of the plate is recessed at 19 to provide clearance for the tool 5 and to form a pair of arms 20, which are somewhat resilient because of the inherent resiliency of the spring steel forming the plate 16.

Figure 6:
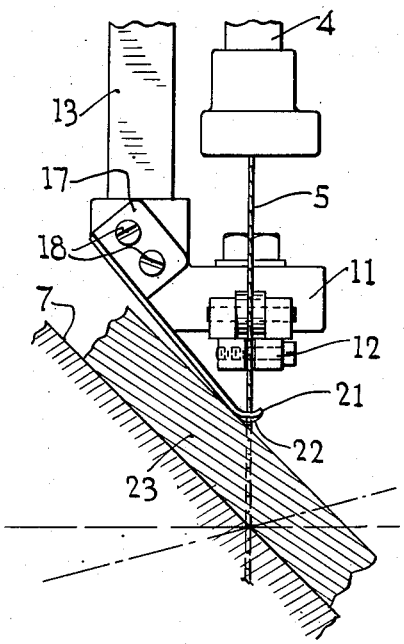
Fig. 6 is a view corresponding to Fig. 4 but showing the table and work-piece in tilted position.

The plate 16 and the arms 20 formed therefrom extend generally in a downward direction and at an angle to the horizontal greater than the maximum angle of tilt of the table 7. In the form of invention shown, the table can tilt 45° from the horizontal, as shown in Fig. 6, and the angle between the downwardly-extending plate 16 or arms 20 and the horizontal is approximately 50°.

The lower edge of the plate 16 or the lower end of the arms 20 extend to and terminate substantially in the work plane of the saw or tool 5. The lower ends thereof are bent upwardly, as indicated at 21, and line-contact bearing members are formed at the lower ends thereof adapted to engage the work-piece both in front of and behind the saw or tool 5 on a line extending in the direction of the work plane. The line-contact bearing members in the form of invention shown consist of raised semi-spherical domes 22 which are formed from the body of the sheet metal.

Since one of the arms 20 lies behind the saw and the other in front thereof, the device serves to hold the work-piece, which is indicated at 23, on the table so that it will not chatter when the saw is reciprocated vertically. The device may be adjusted vertically to accommodate work-pieces of different sizes, and when the table 7 is tilted, as shown in Fig. 6, the line-contact bearing members or domes 22 engage the work-piece on a line extending in the direction of the work plane and hold the work-piece down to the table. The arm 20, which is located in front of the saw, serves not only to hold the work-piece in position but also prevents the operator from getting his fingers into the work plane of and against the saw or tool 5.

The form of invention shown and described herein is most satisfactory. It can be made as a simple stamping easily and inexpensively and it functions to hold the work-piece to the table regardless of the angle of tilt thereof within the limits allowed and requires no tilting adjustment to accommodate the tilting, since the only adjustment necessary is the vertical adjustment to accommodate the thickness of the work-piece.

The preferred form of the invention has been shown and described above. It will be understood that other forms of the invention can be made without departing from the invention which is defined in the appended claims.

I claim:

1. In a jig saw or the like having a vertically-operating tool and a table tiltable about an axis lying in the work plane of said tool and a vertically adjustable work-hold-down comprising a downwardly projecting plate having its lower portion located substantially at the work plane of the tool and recessed to provide tool clearance and terminating at both sides of the saw in work contacting bearing members disposed to engage a work-piece on the table only on a line extending in the direction of said work plane, said bearing members comprising semi-spherical domes extending below said plate, said plate being disposed at an angle to clear said work-piece at various tilted positions of said table.

2. A jig saw or the like having a vertically-operating tool and a table tiltable about an axis lying in the work plane of said tool and a vertically-adjustable work-hold-down comprising a downwardly projecting plate having its lower portion located substantially at the work plane of the tool and recessed to provide tool clearance and terminating at both sides of the saw in work contacting bearing members extending below said plate to form contact points lying in a single line and disposed to engage a work-piece on the table only on a line extending in the direction of said work plane, said plate being disposed at an angle to clear said work piece at tilted positions of said table.

3. A jig saw or the like having a vertically-operating tool and a table tiltable about an axis lying in the work plane of said tool and a work-hold-down comprising a downwardly projecting plate having its lower portion located substantially at the work plane of the tool and recessed to provide tool clearance and terminating at both sides of the saw in work contacting bearing members extending below said plate to form contact points lying in a single line and disposed to engage a work-piece on the table only on a line extending in the direction of said work plane, said plate being disposed at an angle to clear said work piece at tilted positions of said table.

4. Apparatus according to claim 3 in which the table is adjustable substantially 45° from the horizontal and the plate projects downwardly at an angle of greater than 45° to the horizontal.

5. A jig saw or the like having a vertically-operating tool and a table tiltable about an axis lying in the work plane of said tool and a work-hold-down comprising a downwardly-projecting arm terminating in a work-contacting bearing member located substantially at the work plane of said tool and of a width to fall entirely with a line on said work-piece and disposed to engage a work-piece on the table only on a line extending in the direction of said work plane, said projecting arm of the work-hold-down being disposed at an angle to the horizontal greater than the angle to the horizontal to which the work table can be adjusted, whereby said arm will clear said work-piece when the table is tilted to any of its various adjusted positions.

HARRY D. HERDER.

References Cited in the file of this patent

UNITED STATES PATENTS

| Number | Name | Date |
| --- | --- | --- |
| 81,376 | Johnson | Aug. 25, 1868 |
| 940,016 | Hick | Nov. 16, 1909 |
| 1,369,824 | McDonnell | Mar. 1, 1921 |
| 1,781,564 | Beattie | Nov. 11, 1930 |
| 2,073,430 | Tautz | Mar. 9, 1937 |
| 2,165,002 | Ocenasek | July 4, 1939 |
| 2,191,410 | Ocenasek | Feb. 20, 1940 |